United States Patent
Mayo et al.

(10) Patent No.: US 8,274,512 B2
(45) Date of Patent: Sep. 25, 2012

(54) SYSTEM AND METHOD FOR POLYTOPIC MESH REFINEMENT

(75) Inventors: Jackson R. Mayo, Livermore, CA (US); David C. Thompson, Livermore, CA (US); Philippe P. Pebay, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 755 days.

(21) Appl. No.: 12/476,335

(22) Filed: Jun. 2, 2009

(65) Prior Publication Data

US 2010/0045673 A1 Feb. 25, 2010

Related U.S. Application Data (60) Provisional application No. 61/058,802, filed on Jun. 4, 2008.

(51) Int. Cl.
*G06T 15/30* (2011.01)

(52) U.S. Cl. .............................. 345/423; 345/473; 703/2

(58) Field of Classification Search .................. 345/423, 345/473; 703/2
See application file for complete search history.

(56) References Cited

U.S. PATENT DOCUMENTS

| | | | |
|---|---|---|---|
| 5,453,934 | A | 9/1995 | Taghavi et al. |
| 6,578,189 | B2 | 6/2003 | Hariya et al. |
| 7,138,999 | B2 | 11/2006 | Alliez et al. |
| 7,324,103 | B2 | 1/2008 | Stewart et al. |
| 2004/0117163 | A1* | 6/2004 | Rivara ............................... 703/2 |
| 2008/0010046 | A1* | 1/2008 | Furuya et al. ..................... 703/2 |

OTHER PUBLICATIONS

Karl Merkley; Corey Ernst; Jason F. Shepherd; Michael J. Borden; "Methods and Applications of Generalized Sheet Insertion for Hexahedral Meshing", Proceedings of the 16th International Meshing Round Table, Springer Berlin, M. L. Brewer and D. Marcum, eds., 2007, pp. 233-250.

Scott A. Mitchell; Timothy J. Tautges; "Pillowing doublets: refining a mesh to ensure that faces share at most one edge", Proceedings of the 4th International Meshing Round Table, Steenkiste, ed., 1995, pp. 231-240.

Philippe P. Pebay; David C. Thompson; "Communication-Free Streaming Mesh Refinement", Journal of Computing and Information Science in Engineering; 2005, 5(4), pp. 309-316.

Timothy J. Tautges; Sarah E. Knoop; Combinatorial Aspects of Dual-Based Hexahedral Mesh Modification, SIAM Workshop on Combinatorial Scientific Computing, San Francisco, CA, 2004, pp. 1-3.

David C. Thompson; Philippe P. Pebay; "Embarrassingly parallel mesh refinement by edge subdivision", Engineering and Computers, 2006, 22(2), pp. 75-93, 13th International Meshing Roundtable.

Philip M. Tuchinsky; Brett W. Clark; "The "HexTet" Hex-Dominant Automesher: An Interim Progress Report", Proceedings of the 6th International Meshing Roundtable, 1997, pp. 183-193.

(Continued)

*Primary Examiner* — Maurice L McDowell, Jr.
(74) *Attorney, Agent, or Firm* — Timothy P. Evans (57) ABSTRACT

A method is disclosed for partitioning an input polytope into a conformal set of polytopes according to a subdivision pattern specified on lower-dimensional boundaries of the input polytope. A feature of this method is that it is applicable to any dimension. For input polytopes that are hexahedra isomorphic to a 3-dimensional cube, all members of the conforming partition will be hexahedra isomorphic to a 3-dimensional cube. A further feature of the invention is that it preserves convexity; a convex input polytope will result in a conformal partition comprising convex polytopes. Finally, the method may be used to process large conformal meshes of input polytopes in parallel and produce a globally conformal partition without the requirement of communication between processes.

17 Claims, 5 Drawing Sheets

OTHER PUBLICATIONS

Matthew L. Staten; Robert A. Kerr; Steven J. Owen; Ted D. Blacker; "Unconstrained Paving and Plastering: Progress Update", Proceedings of the 15th International Meshing Roundtable, 2006, pp. 469-486.

Matthew L. Staten; Steven J. Owen; Ted D. Blacker; "Unconstrained Paving & Plastering: A New Idea for All Hexahedral Mesh Generation", Proceedings of the 14th International Meshing Roundtable, 2005, pp. 399-416.

Yongjie Zhang; Chandrajit Bajaj; "Adaptive and Quality Quadrilateral/Hexahedral Meshing from Volumetric Data", Proceedings of the 13th International Meshing Roundtable, 2004, 12 pages; http://www.imr.sandia.gov/papers/imr13/zhang.pdg.

* cited by examiner

SYSTEM AND METHOD FOR POLYTOPIC MESH REFINEMENT

CROSS REFERENCE TO RELATED APPLICATIONS

This application claims priority to prior co-pending U.S. Provisional Patent Application Ser. No. 61/058,802 originally filed Jun. 4, 2008 entitled "System and Method for Polytopic Mesh Refinement" from which benefit is claimed.

STATEMENT OF GOVERNMENT SUPPORT

The United States Government has a paid-up license in this invention and the right in limited circumstances to require the patent owner to license to others on reasonable terms as provided for by the terms of contract DE-AC04-94AL85000 awarded by the U.S. Department of Energy to Sandia Corporation.

TECHNICAL FIELD

This invention relates to geometric modeling; scalar, vector, and tensor field approximation including finite-element and finite-volume methods, and particularly including automatic spatial refinement of complexes of polytopes. The case where the polytopes are all hexahedra and refinement is specified by marking edges to be subdivided is the preferred embodiment.

BACKGROUND

A common problem in engineering is the design of a device whose operation is governed by physical phenomena too complex or whose shape is too irregular for a closed-form analytical expression describing its behavior to be developed. In these cases, it is typical for a finite element or finite volume approximation to be created by decomposing the geometric shape of the device and/or the space around the device into a number of primitive shapes over which a simple analytical form is used to approximate some quantity of interest (e.g., stress, strain, temperature). These primitive shapes may be simplices such as lines, triangles, or tetrahedra; or non-simplicial polytopes such as quadrilaterals, hexahedra, pyramids, wedges, or knives. While the analytical forms defined over each primitive are simple, their combination may exhibit complex patterns that closely approximate the solution to some engineering problem. Unfortunately, if the decomposition of the geometry into primitives is too coarse in some regions, the variations allowed by the analytical forms may not approximate the solution well, for example, the behavior of a region at the end of a narrow projection of a machine tool subjected to rapid, inelastic strain.

In these situations, it is desirable to refine the original decomposition in regions where primitives are too coarse. This is easily accomplished with simplicial primitives but not with other primitives because there are no algorithms that automatically create meshes from a boundary specification; this is still typically performed with human assistance. The refinement process must preserve two important properties of meshes to be useful for most simulation techniques.

One of the properties that refinement schemes must preserve is mesh conformality. A mesh of n-dimensional polytopes is conformal if every (n−1)-boundary (face for n=3) of a primitive is shared with at most one neighboring primitive. Furthermore, when an (n−1)-boundary is shared, it must be defined identically by both neighboring primitives; every point on the shared (n−1)-boundary of one primitive must appear on the corresponding shared (n−1)-boundary of the neighbor. Conformal meshes are called complexes.

Refinement schemes must also preserve—or at least gracefully degrade—the geometric quality of the primitives that compose the mesh. There are many different measures of geometric quality, but perhaps the minimum requirement is that: assuming all input primitives are convex then all output primitives shall be convex. Convexity is an important property in finite-element simulations because, for typical parameterizations of primitive polytopes, concavity implies that the Jacobian is negative inside the element. The geometric Jacobian appears in the quadrature formulation used to determine values of scalar, vector, and tensor fields and a negative Jacobian incorrectly weights the contribution of a region of the element to the whole, usually resulting in a divergent simulation.

Besides preserving properties of the mesh, any refinement scheme also requires a way for a simulation to indicate which regions require refinement. In 3-dimensional simplicial (i.e., tetrahedral) refinement schemes, this is typically accomplished by defining a target edge size at vertices (vertex-based refinement); by indicating a set of edges to be subdivided (edge-based refinement); or by indicating a set of faces to be subdivided (face-based refinement). We have shown (Pébay, P. P. and Thompson, D., "Communication-free streaming mesh refinement," *Journal of Computing and Information Science in Engineering*, 2005, v.5(4): pp. 309-316; and Thompson, D. and Pébay, P. P., "Embarrassingly parallel streaming mesh refinement," Engineering and Computers, 2006, v.22(2): pp. 75-93, $13^{th}$ International Meshing Roundtable) how tetrahedral edge-based refinement can be performed in parallel with little or no communication—depending on whether vertices shared between processes need to be cross-referenced.

RELATED ART

Nishigaki et al. (U.S. Pat. No. 6,578,189) discloses a hexahedral mesh generation method. However, their technique does not allow boundary specification, so it cannot be used to perform local mesh refinement.

Other related art in the literature involves template-based hexahedral refinement approaches where choices made for one input hexahedron must be propagated to arbitrarily many other hexahedra in the mesh since each of the neighboring hexahedra may need to alter its template in response to a change from a neighbor (Tautges, T. J. and Knoop, S. E., "Combinatorial aspects of dual-based hexahedral mesh modification," SIAM Workshop on Combinatorial Scientific Computing, (2004); Zhang, Y. and Bajaj, C. "Adaptive and quality quadrilateral/hexahedral meshing from volumetric data," Proceedings of the $13^{th}$ International Meshing Roundtable (2004)). Similarly, there are mesh-generation approaches which require the propagation of constraints across regions (Staten, M., Owen, S., and Blacker, T., "Unconstrained paving and plastering: A new idea for all-hexahedral mesh generation," Proceedings of the $14^{th}$ International Meshing Roundtable, (2005), pp. 399-416; and Staten, M. L., Kerr, R. A., Owen, S. J., and Blacker, T. D., "Unconstrained paving and plastering, Progress update," Proceedings of the $15^{th}$ International Meshing Roundtable, (2006), pp. 469-486).

Finally, some have attempted hex-dominant mesh generation and refinement. In those techniques, hexahedra are preferred but other primitives (generally tetrahedra) are allowed when it is difficult or impossible to determine a configuration of hexahedra that matches a given geometric constraint (Tuchinsky, P. and Clark, B. W., "The hex-tet, hex-dominant automesher: An interim progress report," Proceedings of the 6$^{th}$ International Meshing Roundtable (1997)).

Accordingly, what is desired, and what has not been developed heretofore, is a method for locally refining polytopic meshes according to some externally provided criterion in a way that preserves mesh conformality without requiring updates to neighboring primitives.

SUMMARY

It is an object of the present invention to provide a method for boundary-based refinement of a polytope that yields a conformal partition and preserves convexity.

It is an object of the present invention to provide a method for conformality-preserving, convexity-preserving, boundary-based refinement of non-simplicial meshes containing polytopic primitives. This is accomplished by a series of homothetic transformations of polytopes that isolate topological changes near the boundaries marked to be subdivided from the rest of the mesh.

Therefore, it is an object of this invention to provide a system where 3-dimensional, all-hexahedral, conformal meshes may be refined (remaining all-hexahedral) in parallel with little or no communication between a plurality of computer processes carrying out the refinement on some portion of the mesh.

It is also an object of this invention to provide a method for determining which boundaries of a polytope should be subdivided based on the value of an implicit function $\phi(\vec{x})$ and its gradient $\nabla\phi(\vec{x})$ evaluated at a point or plurality of points on each boundary.

Both the foregoing general description and the following detailed description are exemplary and explanatory only and are intended to provide further explanation of the invention as claimed.

BRIEF DESCRIPTION OF THE DRAWINGS

The accompanying drawings are included to provide a further understanding of the invention and are incorporated in and constitute part of this specification, illustrate one or more embodiments of the invention and together with the description, serve to explain the principles of the invention. The drawings are only for the purpose of illustrating one or more preferred embodiments of the invention and are not to be construed as limiting the invention. In the drawings.

DETAILED DESCRIPTION OF THE PREFERRED EMBODIMENTS

Some applications of the finite element method—such as solid mechanics where shear of thin walls is involved—an provide more accurate results with an all-hexahedral mesh than with, for example, a tetrahedral mesh, by virtue of requiring fewer degrees of freedom. However, all-hexahedral meshing in general can be considered an open problem. Trivial approaches, such as using an automatic tetrahedral mesh generator and decomposing each output tetrahedron into four hexahedra, although automatic, yield meshes of such poor geometric quality that they cannot be used in practice. No practical, fully automatic hexahedral mesh generator is available to date; instead, existing generators require significant user intervention, or generate hybrid meshes, or fail with some inputs.

For these reasons, once a hexahedral mesh of the domain of interest has been obtained, it is important that the best computational use be made of it. In particular, finite element techniques known as h-adaptive methods have been developed in an effort to converge to a solution more rapidly and/or with better accuracy than previously possible. Finite element solvers that incorporate h-refinement have become increasingly popular, and it is therefore of interest to make this technique available for hexahedral meshes. Several approaches have been proposed; however, current techniques either yield non-conformal or hybrid meshes, or these methods require communication of refinement patterns to neighboring elements and iteration until all elements have a pattern that can be accommodated. Furthermore, as problem sizes grow, these tasks must be performed in parallel—which adds a penalty to methods requiring communication of boundary information between portions of a model residing in different processes.

To achieve parallel scalability, what is needed is a local, conformal refinement scheme, similar to that which we had developed previously for tetrahedral mesh refinement (Pébay P. P. and Thompson D. "Communication-free streaming mesh refinement," *Journal of Computing and Information Science in Engineering*, 2005, v.5(4): pp. 309-316). The keystone of this approach is to find hexahedral subdivision templates, given a set of edges to be refined (e.g., based on a target size from a posteriori error estimation), such that neighboring hexahedra always generate the same quadrilaterals on their shared boundary. Such templates ensure that no neighbor information is required for the refined mesh to be conformal everywhere. This global conformality obtained by means of a local criterion allows the method to be implemented in a streaming fashion, and in particular to achieve optimal parallel speedup under load-balanced conditions.

We have developed such a scheme using homothetic transformations to partition a hexahedron into subhexahedra according to some indicator function. The following detailed description will introduce the mathematical basis for the approach (e.g., using homothetic transformations, complexes, and indicator functions) and then demonstrate a simple scheme for local refinement that always produces convex subhexahedra given a convex input.

For the sake of generality, we will describe the application of the scheme based on polytopes in an arbitrary dimension. In particular, we have developed a method for partitioning a convex, non-simplicial, n-dimensional input polytope into a conformal set of output polytopes based on an indicator function. The indicator function takes values on over m-boundaries of the input polytope where $1 \leq m \leq n-1$.

Our main insight is that a series of homothetic transforms may be applied to an original element such as an input polytope, such that the (n−1)-boundaries of the input polytope, the (n−1)-boundaries of the transformed polytope, and (n−1)-planes joining pairs of (n−2)-boundaries (that are boundaries of the (n−1)-boundaries above) partition the input polytope into a set of convex output polytopes. For the case where n=3 and the input polytope is a hexahedron isomorphic to a 3-dimensional cube, all of the output polytopes are hexahedra isomorphic to a 3-dimensional cube as shown for example in FIGS. 3, 4, and 5.

As part of the development of such a method, knowledge of indicator functions, implicit functions, and homothetic transforms will be required as indicated below.

An indicator function (or characteristic function) is an injective map $\chi$ from some set of interest S to the set $\{0, 1\}$. In our application, the domain of this map will be the set of m-boundaries $(m \in \{(n-1), (n-2), \ldots, 1\})$ of an n-dimensional input polytope. Elements of S which $\chi$ maps to 1 will be considered "marked" for subdivision while elements of S which $\chi$ maps to 0 must remain whole as the input polytope is partitioned into output primitives.

An implicit function is a function of the form $f(\vec{x})=0$. Where explicit functions provide a parametric enumeration of the members some manifold (i.e., an expression $\vec{x}(\vec{t})$ which lists all $\vec{x}$ for which $f(\vec{x})=0$ with $\vec{t}$ in some simple domain), implicit functions must be inverted to identify members of the manifold where the equation holds. Typically implicit functions are smooth and we will require piecewise smooth functions for our application. Implicit functions, and specifically those which estimate the geometric signed distance to some manifold, are commonly used in computer graphics as indicator functions that identify the boundary of a surface to be rendered and are therefore well-known in the art. Our application will use implicit indicator functions to identify boundaries of polytopes where refinement should occur.

If some point $\vec{x}$ on an m-boundary (m<n) of an input polytope satisfies $|f(\vec{x})|<\epsilon$, the boundary will be considered "marked" for subdivision. Here $\epsilon>0$ is a number chosen to normalize $f$. The point $\vec{x}$ may be defined in several ways. Examples include but are not limited to the case where $\vec{x}$ is a reference point, such as a mid-point; where $\vec{x}$ is chosen such that some property, such as $f$, varying over the boundary is maximized or minimized; or where $\vec{x}$ is dependent on the homothetic center $\vec{O}$ defined below. An indicator function of the form:

$$\chi(s) = \begin{cases} 1 & \frac{|f(\vec{x}(s))|}{\varepsilon(s)} < 1 \\ 0 & \text{otherwise} \end{cases} \quad (1)$$

may then be used to identify polytope boundaries that are near the surface $f(\vec{x})=0$. Note that where $f$ is smooth, $\nabla f(\vec{x})$ is defined and is a vector normal to the surface. The indicator function may be modified to favor polytope boundaries that have some preferred orientation relative to this surface.

A homothetic transform or "homothecy" is an affine transform that can be expressed solely as a translation and uniform scaling—no rotation or shear is allowed. Thus, an edge or face is parallel to its image under a homothetic transform. Another property of homothecies is that they have a unique fixed point. This fixed point (the origin $\vec{O}$ about which scaling occurs) is known as the homothetic center. Mathematically, a homothecy can be written:

$$h(\vec{x}) = \vec{O} + c(\vec{x} - \vec{O}), \text{ and} \quad (2)$$

$$h: P \rightarrow T, \quad (3)$$

where $\vec{O}$ is the homothetic center, $\vec{x}$ is the untransformed point, $h(\vec{x})$ is the transformed point, c is the contraction or dilation factor, P is the set of all points in some convex polytope, and T is the range of the map h. In those cases where c is positive and less than 1 the transformation moves points closer together while the opposite is true for those cases where c is greater than 1.

When a homothetic transform with $0<c<1$ is applied to all the points on the boundary $\partial P$ of a polytope P, a smaller, transformed version $\partial T$ of that polytopic boundary is produced. Denote P without boundary as $P^* = P \backslash \partial P$ and the closure of P as $\overline{P} = P \cup \partial P$. When the homothetic center of the transform is strictly inside a polytope (i.e., $\vec{O} \in P^*$), we will call the transform an interior homothecy. When the homothetic center lies on a k-boundary within $\partial P$ but is not in the boundary of this k-boundary (i.e., not on a (k−1)-boundary), we call the transform a k-bound homothecy. More specific terminology for the 3-dimensional case is as follows. When the homothetic center lies on a boundary face B of a polyhedron but is not in the boundary of the face (i.e., not on an edge of the face), we call the transform a face-bound homothecy. And when the homothetic center lies on an edge of $\partial P$ but is not in the boundary of the edge (i.e., not on a corner vertex), we call the transform an edge-bound homothecy. Note that whenever $0<c<1$ and where $\vec{O} \in \overline{P}$, then $T \subset \overline{P}$. Furthermore, when $\vec{O} \in B$, then $h(B) \subset \partial P$; that is, a face-bound homothecy will have a transformed element with one of its faces coincident to the corresponding face of polytope P. Similarly, an edge-bound homothecy will have a transformed element with two of its faces and their shared edge coincident to the two corresponding faces and shared edge of polytope P.

The generalized method then for an arbitrary n is:

If no boundaries 2 are selected by the indicator function then the output polytope is not transformed and it remains identical to the input.

If, however, boundaries 2 are selected by the indicator function, then a homothetic transform is applied with a center interior to the input polytope and corresponding (n−2)-boundaries of the input polytope and transformed polytope are joined with corresponding (n−1)-planes such that a level-0 partition is constructed;

for any member of the level-0 partition that shares an m-boundary with the input polytope that is selected by the indicator function apply (n−1)-bound homothetic transforms to obtain a level-1 partition; and, for any member of the level-(l−1) partition that shares an m-boundary with the input polytope that is selected by the indicator function, for l=2, 3, . . . , n−m, apply (n−l)-bound homothetic transforms to obtain a level-l partition.

The output polyhedra are then all members of the level-(n−m) partition and any members of the previous partitions not covered by members of the level-(n−m) partition.

Figure 1A:
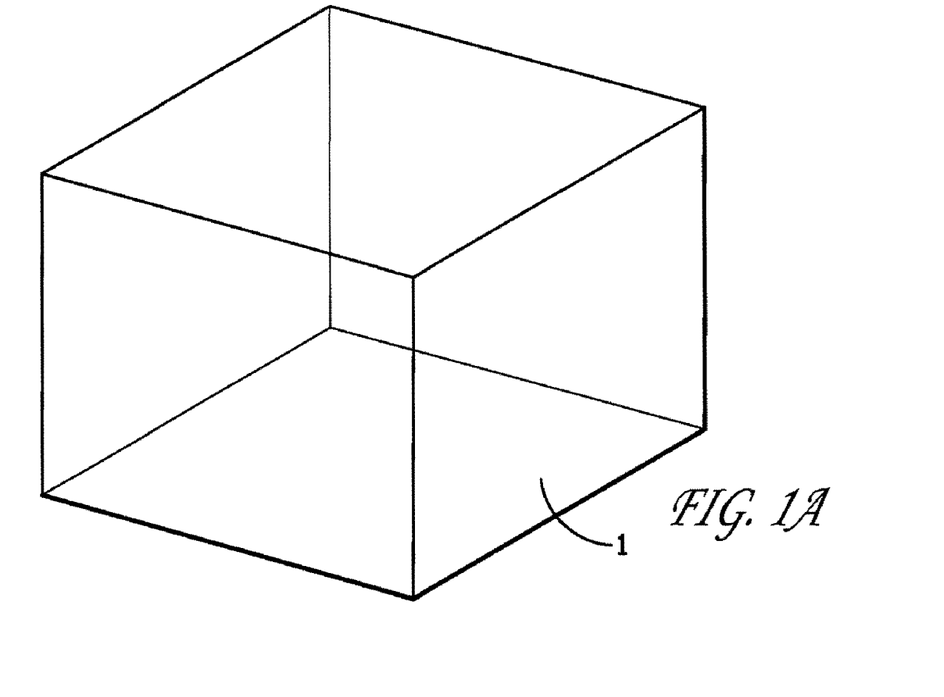
FIG. 1A illustrates a perspective view of a single input hexahedron 1.
Figure 1B:
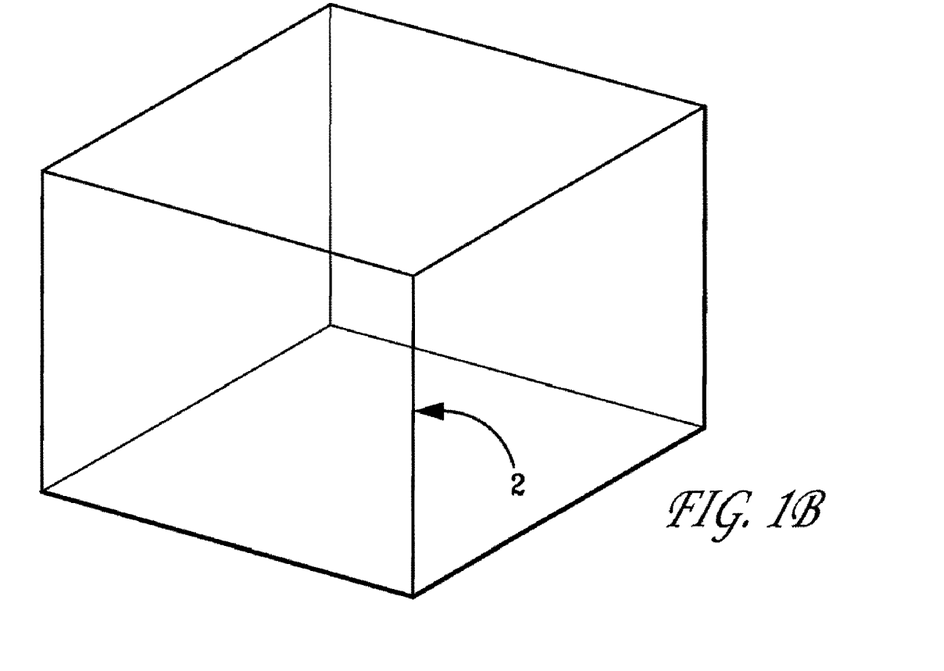
FIG. 1B illustrates a marked edge 2 indicating an edge to be subdivided on input hexahedron 1.
Figure 2A:
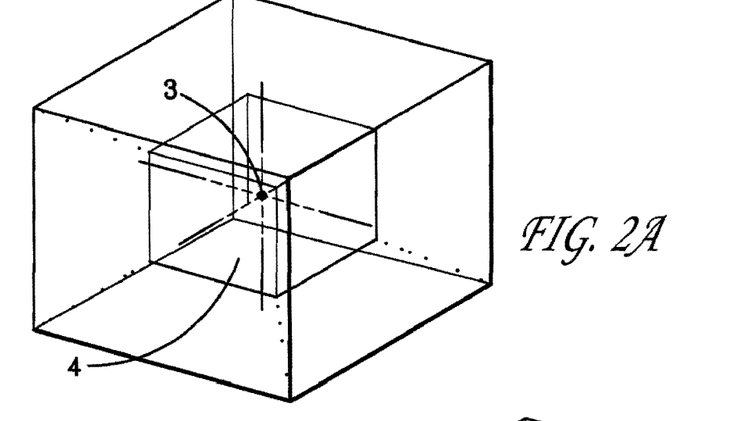
FIG. 2A shows a perspective view of a first configuration of homothecy showing an interior homothecy center 3 strictly interior to hexahedron 1.
Figure 2B:
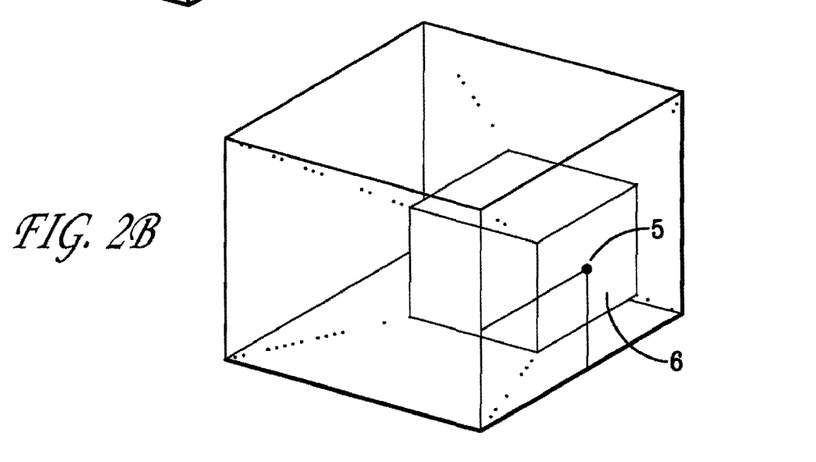
FIG. 2B shows a perspective view of a second configuration of homothecy showing a face-bound homothecy center 5 strictly interior to a face of hexahedron 1.
Figure 2C:
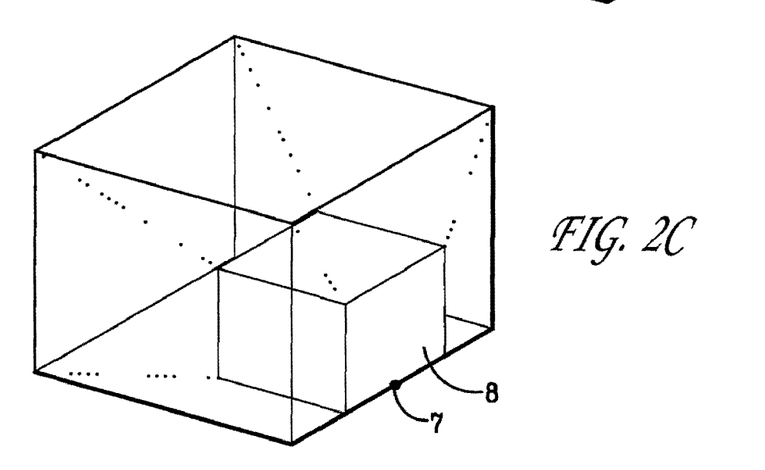
FIG. 2C shows a perspective view of a third configuration of homothecy showing an edge-bound homothecy center 7 strictly interior to an edge of a hexahedron 1.

The primary application of the present method is the case where n=3, the input polyhedron is a hexahedron isomorphic to a 3-dimensional cube (see FIGS. 1A-B), and the indicator function is defined on 1-boundaries (edges). FIG. 1 shows a 1-boundary marked for subdivision.

As noted in the foregoing sections, an implicit function can be used in an indicator function defined on edges and the zero-set of this function will then specify where refinement should occur. Scaling this implicit function by the size of the m-boundary (the edge length in our primary application) will force long edges to be refined when they are further from this zero-set than short edges. (Example measures of the size of an m-boundary are the diameter, the radius of gyration, and the mth root of the m-dimensional volume.) Modifying the function so that m-boundaries with particular orientations are favored is another strategy of interest. As an example, consider in the present case: modulating the implicit function by the dot product of the gradient of the implicit function and the edge direction will force edges pointing directly towards or away from the zero-set to be subdivided while those edges which are parallel to the zero-set will not be subdivided.

Finally, the exact location of the zero off along an edge to be subdivided can be used to locate the center of a homothetic transform or the vertex of a transformed polyhedron. Thus, if we have an implicit function that describes a surface of interest, a volumetric mesh of that surface can be created by refining an input polyhedron containing the surface and discarding any output polyhedra that fall outside the surface. Thus refinement can also be used for mesh generation.

Once refined, the input mesh may be inspected or saved for future use but is most frequently used by one of any number of simulators to predict how the physical domain represented by the generated mesh will respond/react to hypothetical events or conditions present in the environment. Over time, simulators have used various means for providing the sought after predictions. In the past, simulators were actual scale models subjected to scaled conditions expected in the environment of a full scale structure. More recently, simulators were composed of analog electrical circuits whose properties mimicked the system being simulated. Most pertinent to the present application is the case where the simulator is a finite element or finite volume method embodied as instructions in a computer process—perhaps even the same process that performs the mesh refinement—which will utilize the generated mesh to predict and present results either graphically as a printed report or visually as an electronic file displayed on a computer monitor or similar device.

EXAMPLE

For the case where n=3 and input polytopes are hexahedra isomorphic to a 3-dimensional cube, FIGS. 1-5 illustrate the steps of our method. FIG. 1A shows a perspective view of such an input hexahedron 1. FIG. 1B shows marked edge 2, which specifies that input hexahedron 1 is to be subdivided. Each of the three types of homothecy illustrated in FIGS. 2A-2C is used on different hexahedra created during the refinement process. The interior lines connecting adjacent vertices indicate how the vertices of input hexahedron 1, and the transformed hexahedron 4, transformed hexahedron 6, or transformed hexahedron 8 (respectively), can be used to create a decomposition of a hexahedron into seven, six, or five hexahedra (respectively).

When at least one edge is marked for subdivision, an interior homothecy center 3 is used with 0<c<1 to create a transformed hexahedron 4 (shown in FIG. 2A), which is completely interior to the input hexahedron 1. Each corresponding input hexahedron face 9 (shown in FIG. 3A) and transformed hexahedron face 10 are joined by a joining face 11 (shown in FIG. 3B) on each of their four edges to create a set of six hexahedra in addition to the transformed hexahedron 4. An exploded orthographic view of the result of this process is shown in FIG. 4 which shows the seven subdivided intermediate hexahedra.

Figure 3A:
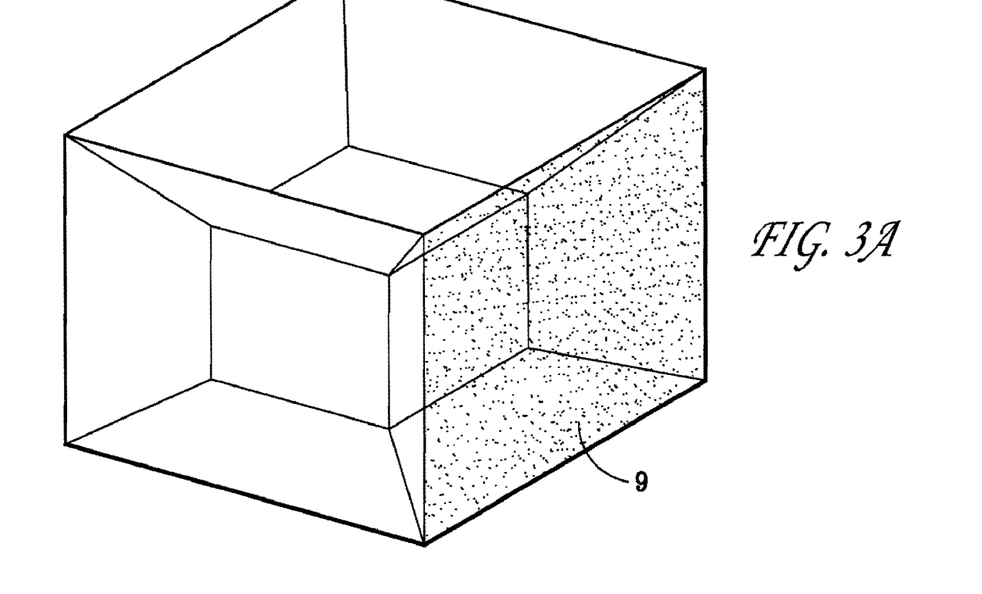
FIGS. 3A and 3B show a pair of perspective views of input hexahedron 1 with an interior homothecy applied.
Figure 3B:
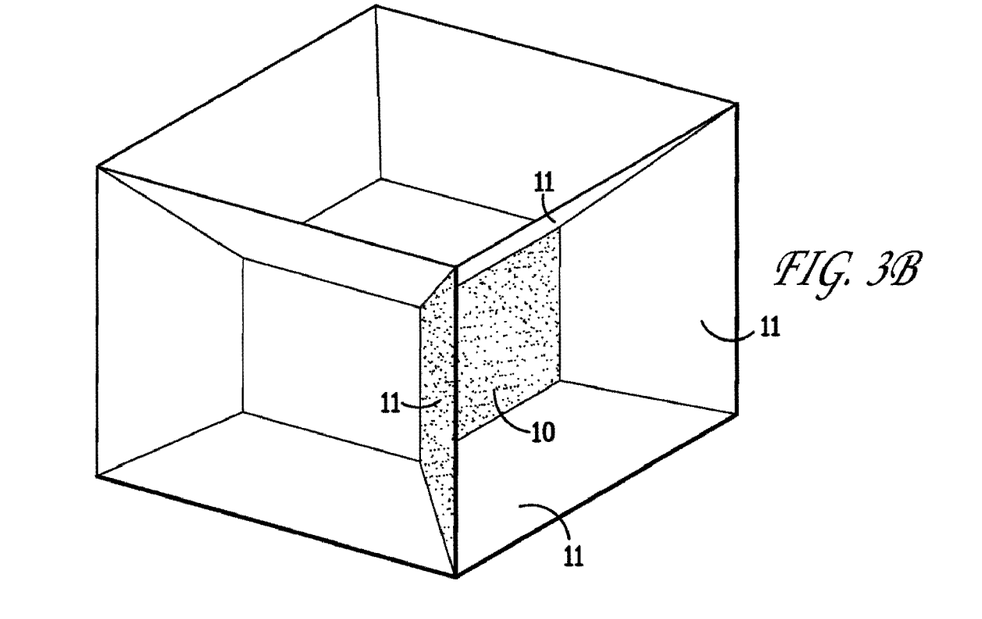
Figure 4:
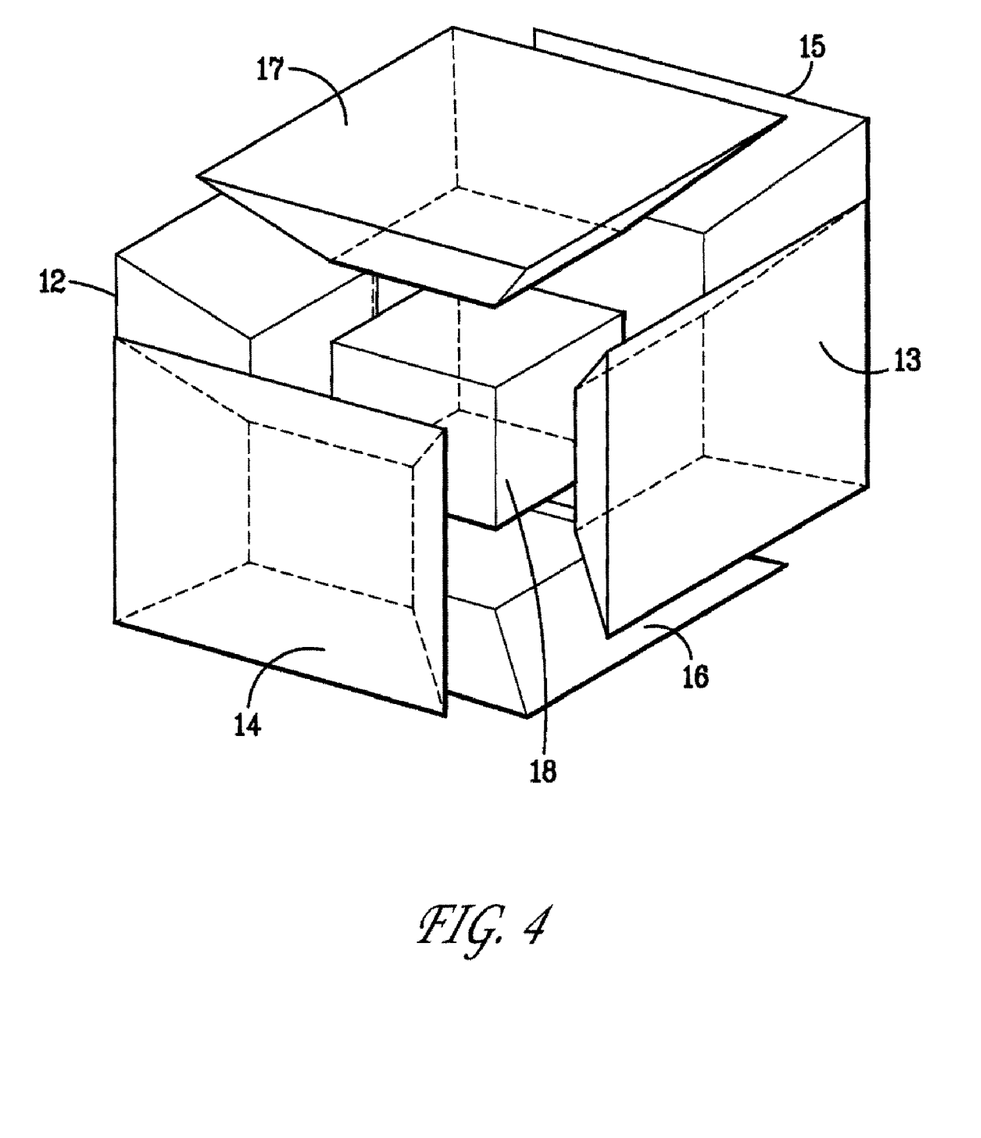
FIG. 4 shows an orthographic view of an input hexahedron 1 subdivided into seven intermediate hexahedra 12-18.

Note that in FIGS. 3A and 3B input hexahedron face 9 and transformed hexahedron face 10 are parallel to one another by virtue of the homothetic transform applied to obtain transformed hexahedron 4. This property guarantees that each of the corresponding edge pairs bounding the faces are contained by a joining face 11. The faces of the input hexahedron 1, the faces of the transformed hexahedron 4, and joining faces 11, therefore, divide the input hexahedron 1 into seven intermediate hexahedra. Because the seven hexahedra may each be formed as the intersection of six planar half-spaces, each will be convex.

Figures 5A, 5B, 5C:
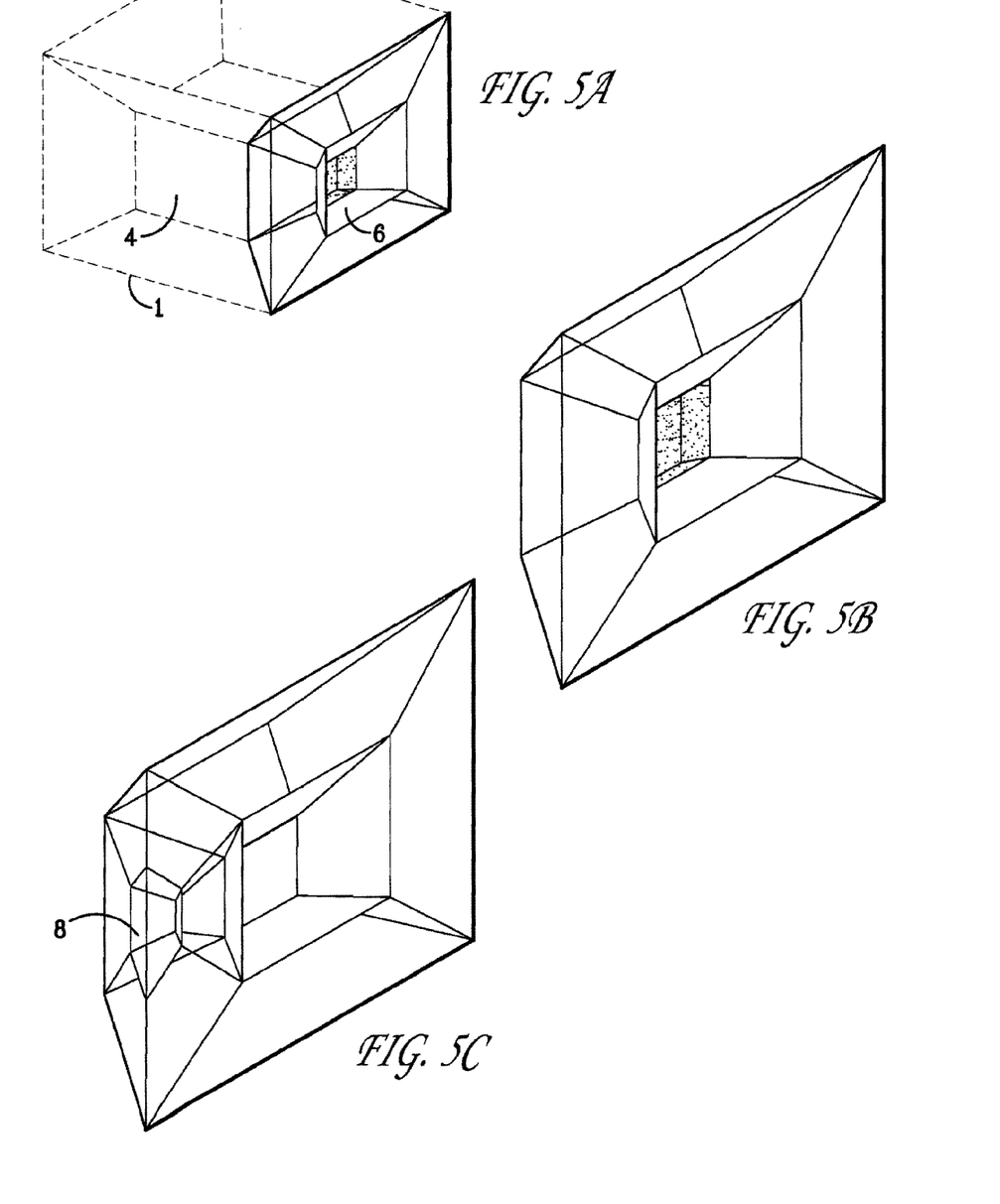
FIG. 5A, for each face of the input hexahedron 1 containing one or more marked edges 2 a homothecy with a face-bound center is applied to the corresponding hexahedron from FIG. 3B, resulting in six hexahedra that replace one of the seven from FIG. 3B.
FIG. 5B shows an isolated view of the results of the face-bound homothecy applied to intermediate hexahedron (+X) 13.
FIG. 5C shows, for one of those four of the six resulting hexahedra that share an edge with the input hexahedron 1, the result of a new edge-bound homothetic transform that is applied if that edge is marked.

FIGS. 5A-5C show a series of three perspective views continuing the illustration of the refinement process begun in FIGS. 3A and 3B. For any of these six hexahedra whose input face 9 contains at least one edge marked for further subdivision, this hexahedron will have a homothecy applied to it with a face-bound homothecy center 5 (shown in FIG. 2B), such that a face of the resulting transformed hexahedron 6 (shown in FIG. 5A) is coplanar with input face 9. A face-bound homothecy results in a single hexahedron being divided into six intermediate hexahedra that replace one of the seven hexahedra shown in FIG. 3B, that is, the hexahedron defined by faces 9, 10, and 11 is divided into the transformed hexahedron 6, the four "surrounding" hexahedra, and a "center" hexahedron behind the transformed hexahedron 6, shown in FIG. 5B: an isolated view of the results of the face-bound homothecy applied to intermediate hexahedron (+X) 13.

Lastly, in the case where an edge of any of the four "surrounding" hexahedra shown in FIG. 5B that share an edge with input hexahedron 1, is marked for further subdivision, then a final homothecy is applied. This time a homothecy with the edge-bound homothecy center 7 (shown in FIG. 2C) is applied so that an edge of the transformed hexahedron 8 (shown in FIG. 5C) lies on an edge of the original input hexahedron 1. In this manner, any combination of edges to be subdivided may be handled. FIG. 5C shows, for one of those four of the six resulting hexahedra from FIG. 5B that share an edge with the input hexahedron 1, the result of a new edge-bound homothetic transform that is applied if that edge is marked. For the input hexahedron 1, with marked edge 2 (shown in FIG. 1B), intermediate hexahedron (+X) 13 and intermediate hexahedron (−Y) 14 would each have one face-bound homothecy and one edge-bound homothecy applied. Only intermediate hexahedron (+X) 13 is shown.

Note that none of the subdivisions performed specify the exact homothecy center and contraction factor used to generate the output primitives. While the homothecy center is constrained to lie in the interior of input hexahedron 1, on a face of input hexahedron 1, or on an edge of the input hexahedron 1, the exact position of the homothecy center and the contraction factor may be chosen to maximize some geometric quality of the output hexahedra, provided the homothecy center and the contraction factor for faces and edges are chosen identically for all input hexahedra sharing the face or edge.

Having thus described exemplary embodiments of the present invention, it should be noted by those skilled in the art that the disclosures herein are exemplary only, and that various other alternatives, adaptations, and modifications may be made within the scope of the present invention. Accordingly, the present invention is not limited to the specific embodiments as illustrated herein, but is only limited by the following claims.

Finally, to the extent necessary to understand or complete the disclosure of the present invention, all publications, patents, and patent applications mentioned herein are expressly incorporated by reference therein to the same extent as though each were individually so incorporated.

What is claimed is:

1. A method using a computer including program code for providing a conformal set of polytopes that partition a non-simplicial n-dimensional input polytope according to a selection made by an indicator function of one or more of the input polytope m-boundaries, where $1 \leq m \leq n-1$, and wherein vertices of the conformal set of polytopes comprise vertices of the input polytope, vertices placed on m-boundaries of the input polytope indicated by the indicator function, and zero or more vertices placed on the input polytope l-boundaries for any $m+1 \leq l \leq n-1$ and contained within the interior of the input polytope, comprising:

listing the input polytope itself if no m-boundaries are selected by the indicator function, or listing a conformal set of polytopes defined by the vertices of the input polytope, the vertices placed on m-boundaries of the input polytope indicated by the indicator function, and the vertices on the l-boundaries for any $m+1 \leq l \leq n-1$ and in the interior of the input polytope, wherein the conformal set of polytopes are output to a visual display, a printed report, a mass storage device, a simulator, or a combination thereof, wherein providing the set of polytopes defined by said vertices comprises:

listing the input polytope itself if no boundaries are selected by the indicator function, or applying a homothetic transform $h(\vec{x}) = \vec{O} + c(\vec{x} - \vec{O})$ wherein $\vec{O}$ is a homothetic center interior to the input polytope, $\vec{x}$ is an untransformed point, $h(\vec{x})$ is a transformed point, and $0 < c < 1$ is a contraction factor, and joining corresponding (n−2)-boundaries of the input polytope and transformed polytope with (n−1)-planes such that a level-0 partition is constructed;

applying (n−1)-bound homothetic transforms to any member of the level-0 partition that shares an m-boundary with the input polytope that is selected by the indicator function to obtain a level-1 partition;

applying (n−1)-bound homothetic transforms to any member of the level-(l−1) partition for $l=2, 3, \ldots, n-m$, that shares an m-boundary with the input polytope that is selected by the indicator function to obtain a level-l partition; and listing all members of the level-(n−m) partition and any members of the previous partitions not covered by members of the level-(n−m) partition.

2. The method of claim 1, wherein the homothetic transform centers and contraction factors are chosen to force vertices placed on m-boundaries of the input polytope indicated by the indicator function to occur at locations specified by the indicator function or to maximize a geometric quality of the conformal set of polytopes, or some combination thereof.

3. The method of claim 2, wherein the input polytope is part of a conformal mesh of input polytopes.

4. The method of claim 3, wherein the partitions of the (n−1)-boundaries of the input polytope are automatically identical to those for neighboring polytopes using the same indicator function.

5. The method of claim 4, wherein the step of constructing partitions is performed in parallel by several computer processes such that each computer process process lists a conformal set of polytopes for a distinct subset of the conformal mesh of input polytopes.

6. The method of claim 4, wherein the step of constructing partitions is performed by one or more computer processes in a streaming manner such that only one input polytope from the conformal mesh is accessed per process at any given time.

7. A method using a computer including program code for providing a conformal set of polytopes that partition a non-simplicial n-dimensional input polytope according to a selection made by an indicator function of one or more of the input polytope m-boundaries, where $1 \leq m \leq n-1$, and wherein vertices of the conformal set of polytopes comprise vertices of the input polytope, vertices placed on m-boundaries of the input polytope indicated by the indicator function, and zero or more vertices placed on the input polytope l-boundaries for any $m+1 \leq l \leq n-1$ and contained within the interior of the input polytope, comprising:

listing the input polytope itself if no m-boundaries are selected by the indicator function, or listing a conformal set of polytopes defined by the vertices of the input polytope, the vertices placed on m-boundaries of the input polytope indicated by the indicator function, and the vertices on the l-boundaries for any $m+1 \leq l \leq n-1$ and in the interior of the input polytope, wherein the conformal set of polytopes are output to a visual display, a printed report, a mass storage device, a simulator, or a combination thereof, wherein the input polytope and the conformal set polytopes are hexahedra isomorphic to a 3-dimensional cube.

8. The method of claim 7, wherein the indicator function acts on edges (1-boundaries) of the input hexahedron.

9. The method of claim 8, wherein listing the set of hexahedra comprises:

listing the input hexahedron itself if no edges are selected by the indicator function; or applying at least an edge-bound homothetic transform to the input hexahedron and listing all members of the resulting partition if exactly one edge of the input hexahedron is selected by the indicator function; or applying at least a face-bound homothetic transform to the input hexahedron to obtain a level-1 partition if two or more edges of the input hexahedron are selected by the indicator function and all such edges are contained in a single face, and applying an edge-bound homothetic transform to at least any member of the level-1 partition that shares an edge with the input hexahedron that is selected by the indicator function to obtain a level-2 partition, and listing all members of the level-2 partition and any members of the level-1 partition not covered by members of the level-2 partition; or applying a homothetic transform with a center interior to the input hexahedron to obtain a level-0 partition if two or more edges of the input hexahedron are selected by the indicator function and not all such edges are contained in a single face, and applying a face-bound homothetic transform to at least any member of the level-0 partition that shares two or more edges with the input hexahedron that are selected by the indicator function to obtain a level-1 partition, and applying an edge-bound homothetic transform to at least any member of the level-0 and/or the level-1 partition that shares an edge with the input hexahedron that is selected by the indicator function to obtain a level-2 partition, and listing all members of the level-2 partition and any members of the level-0 and level-1 partitions not covered by members of the level-2 partition.

10. The method of claim 9, wherein the homothetic transform centers and contraction factors are chosen to force vertices placed on edges of the input hexahedron indicated by the indicator function to occur at locations specified by the indicator function or to maximize a geometric quality of the conformal set of hexahedra, or some combination thereof.

11. The method of claim 7, wherein coincident vertices of the conformal set of polytopes are identified as they are listed so that no duplicate vertices remain when the conformal set of polytopes is listed.

12. The method of claim 7, wherein the indicator function for an m-boundary of the input polytope includes a measure of the size of the m-boundary of the input polytope.

13. A method using a computer including program code for providing a conformal set of polytopes that partition a non-simplicial n-dimensional input polytope according to a selection made by an indicator function of one or more of the input polytope m-boundaries, where $1 \leq m \leq n-1$, and wherein vertices of the conformal set of polytopes comprise vertices of the input polytope, vertices placed on m-boundaries of the input polytope indicated by the indicator function, and zero or more vertices placed on the input polytope l-boundaries for any $m+1 \leq l \leq n-1$ and contained within the interior of the input polytope, comprising:

listing the input polytope itself if no m-boundaries are selected by the indicator function, or listing a conformal set of polytopes defined by the vertices of the input polytope, the vertices placed on m-boundaries of the input polytope indicated by the indicator function, and the vertices on the l-boundaries for any $m+1 \leq l \leq n-1$ and in the interior of the input polytope, wherein the conformal set of polytopes are output to a visual display, a printed report, a mass storage device, a simulator, or a combination thereof, wherein the indicator function for an m-boundary of the input polytope includes an evaluation of an implicit function at a point or plurality of points on the m-boundary of the input polytope.

14. The method of claim 13, wherein the implicit function evaluated on an m-boundary of the input polytope is scaled by a measure of the size of the m-boundary of the input polytope.

15. A method using a computer including program code for providing a conformal set of polytopes that partition a non-simplicial n-dimensional input polytope according to a selection made by an indicator function of one or more of the input polytope m-boundaries, where $1 \leq m \leq n-1$, and wherein vertices of the conformal set of polytopes comprise vertices of the input polytope, vertices placed on m-boundaries of the input polytope indicated by the indicator function, and zero or more vertices placed on the input polytope l-boundaries for any $m+1 \leq l \leq n-1$ and contained within the interior of the input polytope, comprising:

listing the input polytope itself if no m-boundaries are selected by the indicator function, or listing a conformal set of polytopes defined by the vertices of the input polytope, the vertices placed on m-boundaries of the input polytope indicated by the indicator function, and the vertices on the l-boundaries for any $m+1 \leq l \leq n-1$ and in the interior of the input polytope, wherein the conformal set of polytopes are output to a visual display, a printed report, a mass storage device, a simulator, or a combination thereof, wherein the indicator function for an m-boundary of the input polytope varies with the orientation of the m-boundary of the input polytope.

16. A method using a computer including program code for providing a conformal set of polytopes that partition a non-simplicial n-dimensional input polytope according to a selection made by an indicator function of one or more of the input polytope m-boundaries, where $1 \leq m \leq n-1$, and wherein vertices of the conformal set of polytopes comprise vertices of the input polytope, vertices placed on m-boundaries of the input polytope indicated by the indicator function, and zero or more vertices placed on the input polytope l-boundaries for any $m+1 \leq l \leq n-1$ and contained within the interior of the input polytope, comprising:

listing the input polytope itself if no m-boundaries are selected by the indicator function, or listing a conformal set of polytopes defined by the vertices of the input polytope, the vertices placed on m-boundaries of the input polytope indicated by the indicator function, and the vertices on the l-boundaries for any $m+1 \leq l \leq n-1$ and in the interior of the input polytope, wherein the conformal set of polytopes are output to a visual display, a printed report, a mass storage device, a simulator, or a combination thereof, wherein the indicator function divides an input polytope such that a subset of the boundaries of a subset of the set of conforming polytopes approximate a closed n-dimensional surface.

17. The method of claim 16, wherein either the subset of the set of conforming polytopes interior to the approximation of the closed n-dimensional surface, or exterior to the approximation of the closed n-dimensional surface.

* * * * *